(12) United States Patent
Youngblood

(10) Patent No.: US 9,730,498 B2
(45) Date of Patent: Aug. 15, 2017

(54) METHOD OF CONNECTING JEWELRY COMPONENTS

(71) Applicant: Gwendolyn Fuller Youngblood, San Antonio, TX (US)

(72) Inventor: Gwendolyn Fuller Youngblood, San Antonio, TX (US)

(*) Notice: Subject to any disclaimer, the term of this patent is extended or adjusted under 35 U.S.C. 154(b) by 406 days.

(21) Appl. No.: 14/313,424

(22) Filed: Jun. 24, 2014

(65) Prior Publication Data

US 2014/0373356 A1   Dec. 25, 2014

Related U.S. Application Data (60) Provisional application No. 61/840,066, filed on Jun. 27, 2013, provisional application No. 61/839,183, filed on Jun. 25, 2013.

(51) Int. Cl.

| | | |
|---|---|---|
| *F16B 5/04* | (2006.01) | |
| *A44C 27/00* | (2006.01) | |
| *B21J 15/04* | (2006.01) | |

(52) U.S. Cl.
CPC .............. *A44C 27/00* (2013.01); *B21J 15/041* (2013.01); *F16B 5/04* (2013.01); *Y10T 29/4959* (2015.01); *Y10T 29/53* (2015.01)

(58) Field of Classification Search
CPC ...... A44C 27/00; Y10T 29/4959; Y10T 29/53; B21J 15/041; F16B 5/04
See application file for complete search history.

(56) References Cited

U.S. PATENT DOCUMENTS

2012/0055008 A1* 3/2012 Boulet .................. F16B 37/067
                                                            29/505

* cited by examiner

*Primary Examiner* — Sarang Afzali
*Assistant Examiner* — Ruth G Hidalgo-Hernandez
(74) *Attorney, Agent, or Firm* — Gunn, Lee & Cave, P.C.

(57) ABSTRACT

Two plates, corresponding to the diameter of a length of riveting material being used, act as gauges and are placed separately on the top and bottom of at least one components to be made into a jewelry item. The length of material, such as a wire or tubing, is passed through holes in all the components, and the holes of the plates. This allows the jewelry maker to cut the length of material flush with the exposed surface of the plate on the top of the stack. This automatically measures the optimal length of material needed to span the combined thickness of all the components to be riveted together, while providing the desired length exposed at the top and bottom of the stacked pieces, to fashion a properly formed and secure flattened rivet head on each end of the length of material.

9 Claims, 7 Drawing Sheets

METHOD OF CONNECTING JEWELRY COMPONENTS

CROSS-REFERENCES TO RELATED APPLICATIONS

This original nonprovisional application claims the benefit of the filing date of U.S. provisional application Ser. No. 61/840,066, filed Jun. 27, 2013, and U.S. provisional application Ser. No. 61/839,183, filed Jun. 25, 2013, each of which is incorporated by reference herein.

STATEMENT REGARDING FEDERALLY-SPONSORED RESEARCH OR DEVELOPMENT

Not applicable.

BACKGROUND OF THE INVENTION

1. Field of the Invention

The present invention relates to jewelry fabrication. More specifically, the present invention relates to a method of forming a rivet as part of the manufacturing of a jewelry item, either to connect a plurality of jewelry components together or to form a decorative rivet.

2. Description of the Related Art

Rivets are one of the most secure cold connections used in jewelry fabrication, and may also be used for ornamental aspects of a jewelry item. Cutting the precisely desired length of riveting wire or tubing to use as a functional or decorative rivet is the most important component to successful riveting.

Jewelry makers currently estimate the length of riveting wire or tubing to use as a rivet. This often results in rivets that are too short to be secure or too long to be properly formed.

Until a jewelry maker has acquired near "expert" skills over many failed attempts over a long period of time, the estimation of the length of wire needed for a solid riveted connection is a haphazard process. The result is an increased number of failed connections when fabricating jewelry with rivets—specifically, rivets that are, for example, too short to form a solid connection, or too long to seat fully, resulting in a loose connection, with a "laid over" appearance, that potentially snags on clothing or skin.

SUMMARY OF THE INVENTION

The present invention reduces the effort and skills needed to cut the precise desired length of riveting wire or tubing needed for a successful rivet connection when fabricating jewelry. The invention allows the jewelry maker to cut a rivet to the exact length required to allow the consistent formation and completion of a secure and properly formed cold connection when making jewelry. The reduced effort results in more successful jewelry connections, less repeated attempts to create a riveted connection, plus improved quality and appearance of the jewelry.

The methodology reduces the effort and skills needed to cut the precise length of riveting wire needed for a successful rivet connection when making jewelry. The reduced effort results in more successful jewelry connections, less repeated attempts to create a riveted connection, plus improved quality and appearance of the jewelry created.

DETAILED DESCRIPTION OF THE INVENTION

Figure 1:
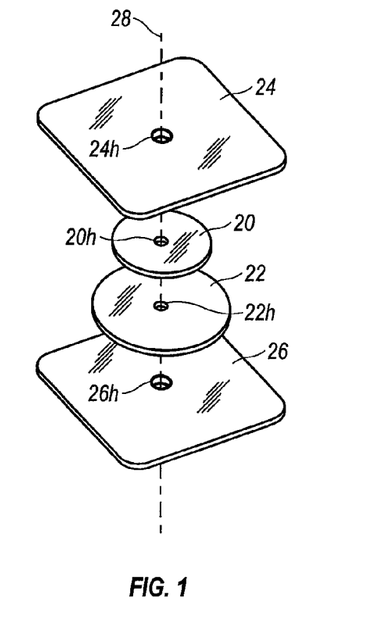
FIGS. 1-6 show steps of one embodiment of the invention.

FIGS. 1-7 show one method of the present invention used to connect two jewelry components during the manufacture of a jewelry item. Referring to FIG. 1, the two components include a first component 20 and a second component 22. In this instance, both components 20, 22 are cylindrical with a cylindrical surface defining a hole 20$h$, 22$h$ through the respective component. The components 20, 22 are linearly aligned along an axis 28 with the centers of the holes 20$h$, 22$h$ intersecting the axis. The shape of the components is not important to the invention. Moreover, while FIGS. 1-7 show the holes 20$h$, 22$h$ positioned in the center of the components 20, 22, the holes 20$h$, 22$h$ may be positioned anywhere within the components 20, 22.

A first plate 24 and a second plate 26 are positioned on either side of the components 20, 22. Each plate 24, 26 is identically shaped and generally square with rounded corners. Each plate 24, 26 has a cylindrical surface defining a hole 24$h$, 26$h$ through the center of the respective plate. The size of each of the holes 24$h$, 26$h$ is larger than the holes 20$h$, 22$h$ in the components 20, 22. The plates 24, 26 are linearly aligned along the axis 28. In this embodiment, the plates 24, 26 have the same thickness, although other embodiments contemplate using plates of different thickness in cases where the thicknesses of the components 20, 22 are different.

Figure 2:
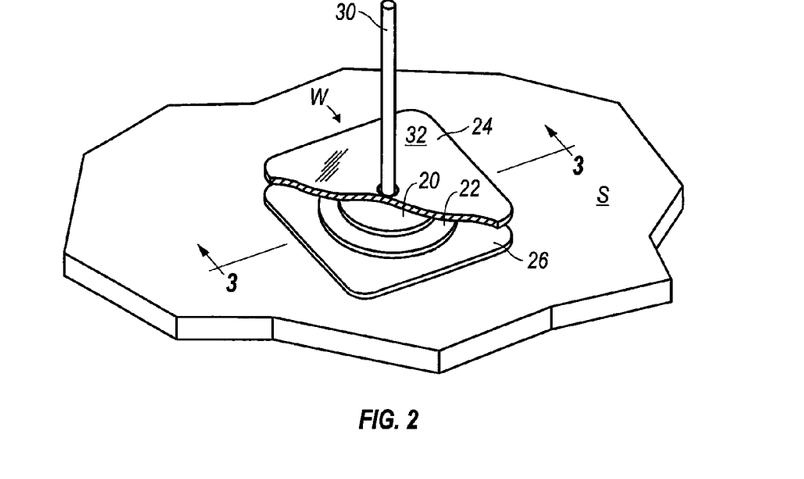
Figure 3:
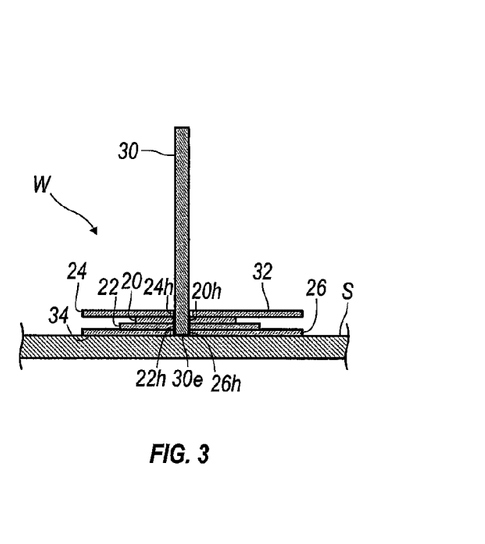

Referring to FIGS. 2-3, after the holes 20$h$, 22$h$, 24$h$, 26$h$ are linearly aligned as shown in FIG. 1, a wire 30 having a wire end 30$e$ and a diameter corresponding to the holes 20$h$, 22$h$ (i.e., sized to fit snugly within each hole) is passed through them as well as holes 24$h$, 26$h$ to form a workpiece W. The workpiece W includes the first component 20, the second component 22, the first plate 24, the second plate 26, and the wire 30. The workpiece W has a first outer surface 32 and a second outer surface 34. The first component 20 and second component 22 are in the space between the first outer surface 32 and the second outer surface 34 and separate the first plate 24 from the second plate 26.

Following assembly of the workpiece W, the second plate 26 is placed on a hard, flat surface S so that the end 30$e$ of the wire 30 is flush with the second outer surface 34 and in contact with the surface S. The second outer surface 34 is also in contact with the surface S. The second component 22 is in contact with the second plate 26. The first component 20 is in contact with the second component 22. The first plate 24 is in contact with the first component 20. The wire 30 occupies the holes 20$h$, 22$h$, 24$h$, 26$h$ of the components 20, 22 and the plates 24, 26.

Figure 4:
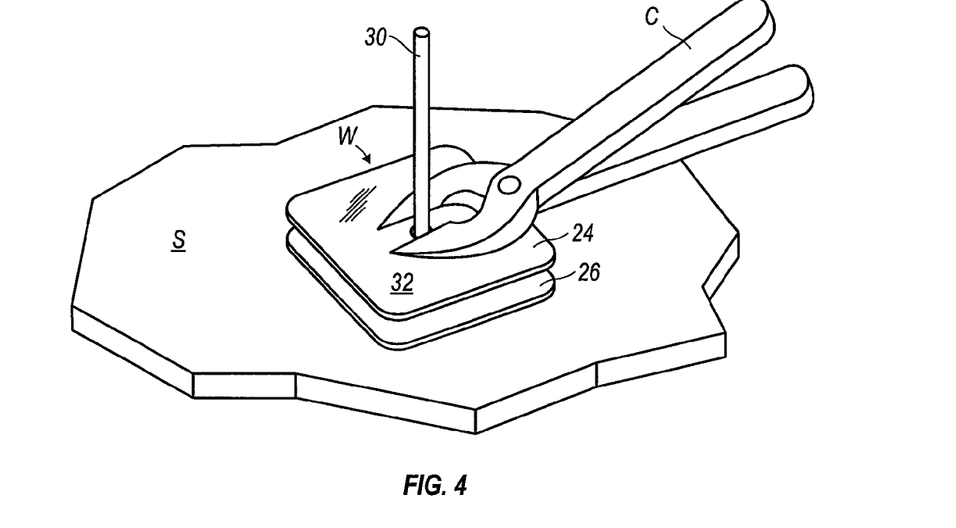

Referring to FIG. 4, flush cutters C are used to cut the wire 30 flush with the first outer surface 32. After cutting, the length of the wire 30 of the workpiece W equals the distance between the first outer surface 32 and the surface S, which is also the distance between the first outer surface 32 and the second outer surface 34.

Figure 5:
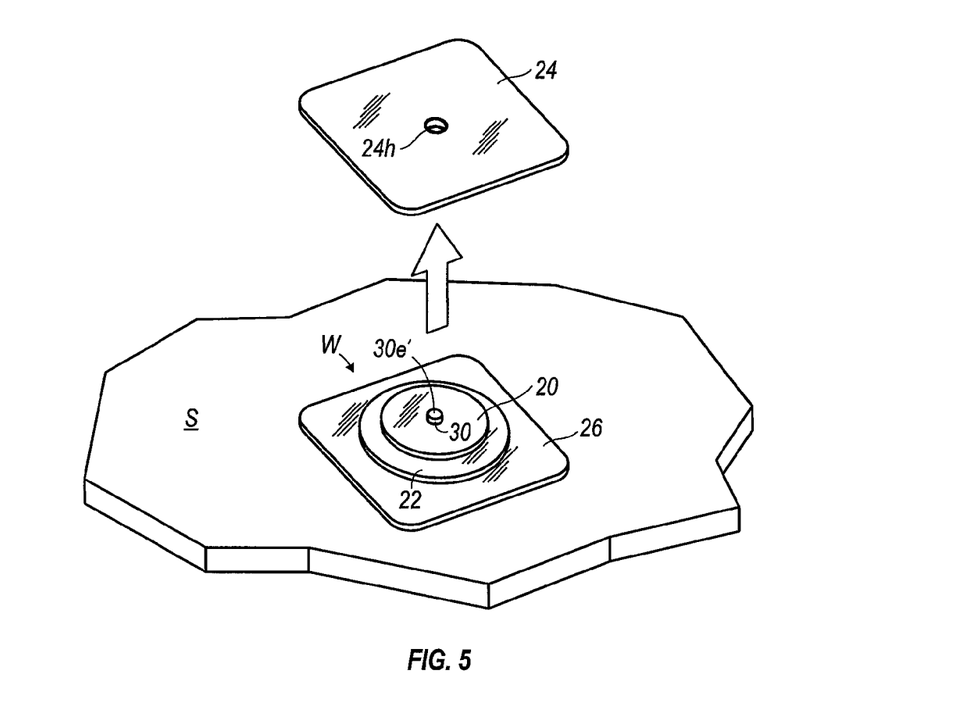

Referring to FIG. 5, the first plate 24 is removed from the workpiece W, leaving a second wire end 30$e'$ extending past the first component 20 by a length equal to the thickness of the first plate 24. The wire end 30$e'$ is then tapped with a riveting hammer to flatten it against the first component 20, thereby forming a first rivet 33. Notably, this will also flatten the opposing wire end that is in contact with the surface S to a lesser degree and caused increased frictional engagement against the cylindrical surface defining the hole 26h of the second plate 26.

Figures 6, 8:
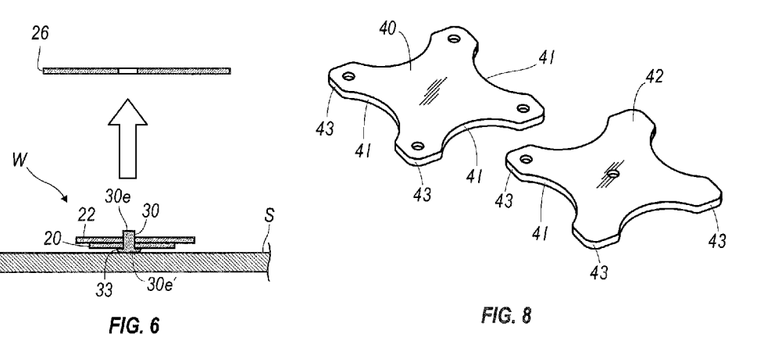
FIG. 8 shows alternative embodiments of plates that may be used to implement the steps of the invention.
Figure 7:
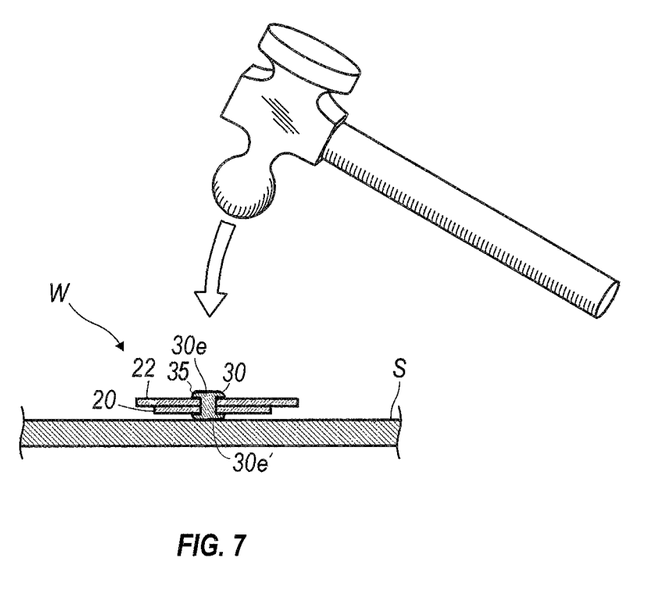

Referring to FIG. 6, the workpiece W is then inverted and placed on the surface S. The second plate 26 is removed, leaving a length of the wire 30 extending past the second component 22 by a length equal to the thickness of the second plate 26. Notably, the second plate 26 is removable around the end 30e because the hole 26h is larger than this end 30e of the wire when minimally flattened as described with reference to FIG. 5. Referring to FIG. 7, this end 30e of the wire 30 is then tapped with a riveting hammer to flatten it against the second component 22 to form a second rivet 35. After this step, the first component 20 and second component 22 are mechanically connected.

In alternative embodiments, tubing can be used instead of the solid wire 30 described with reference to FIGS. 1-7. In such embodiments, however, instead of cutting the tubing with flush cutters C as described with reference to FIG. 4 (which would crush the tubing), the tubing is marked (e.g., with a marker) at a position flush with the outer surface 24. The tubing is then sawed to produce a small length of tubing. The small length of tubing is placed through the holes, with one end resting on the surface S. The first plate 24 is removed and the exposed end of the tubing is flattened. The workpiece W is then flipped over and the second plate removed so that the opposing end of the tubing can be flattened.

FIG. 8 shows other embodiments of plates 40, 42 that may be used in the method of the present invention. The plates can be made in many sizes and shapes and with many configurations of holes to allow for adaptation to diverse jewelry-fabrication scenarios. For example, each of the plates 40, 42 is generally X-shaped, with concave side surfaces 41 interposed between convex side surfaces 43. The plates are preferably made of a durable material (e.g., metal) to support the jewelry components being riveted together.

The thicknesses of the plates selected correspond to the various diameters of riveting wire used in making jewelry. Preferably, the thickness of each plate is one-half the size of the diameter of the wire to be used. One or more holes are drilled in each plate. A legend may be stamped on each plate to identify its thickness (e.g., "14," "16," or "18" to represent fourteen-gauge, sixteen-gauge or eighteen-gauge wire, respectively). The plates may be packaged in a non-rigid container, such as a bag, and sold as part of a kit to jewelry fabrication hobbyists.

Figure 9:
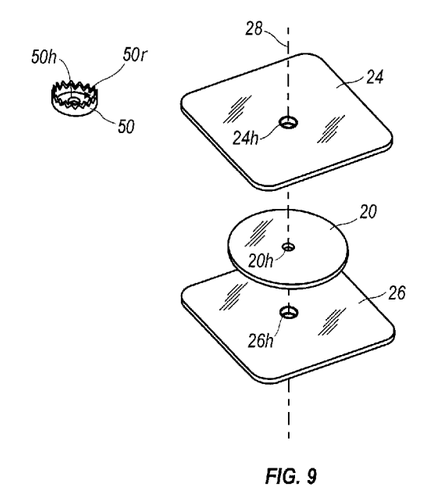
FIG. 9-14 shows steps of another embodiment of the invention.
Figure 10:
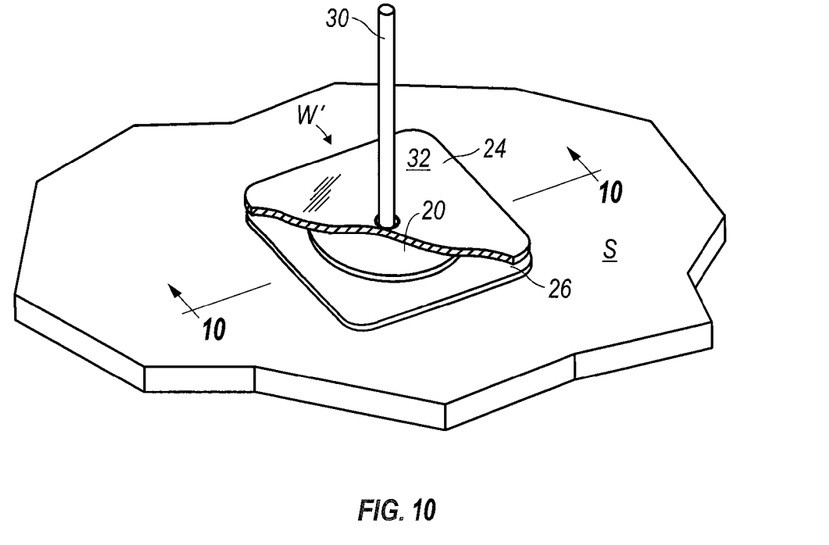
Figure 11:
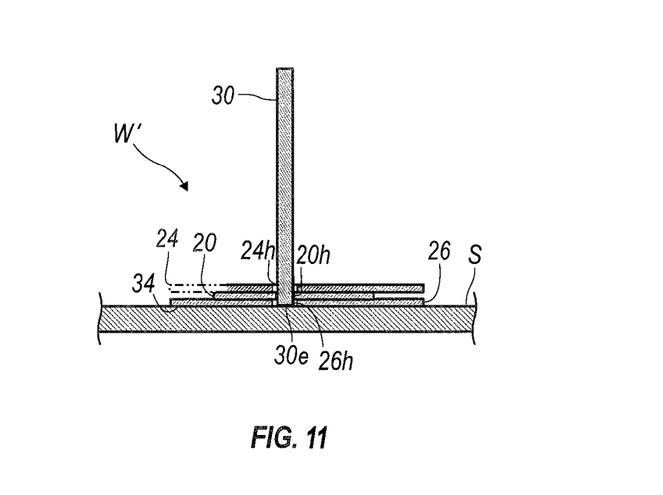

FIGS. 9-11 show another embodiment of the invention wherein a first component 20 with a hole 20h is secured to a non-planar second component, such a bezel cup 50 with a center hole 50h and defining a recess 50r. Referring to FIG. 9, the hole 20h is linearly aligned with the hole 24h of the first plate 24 and the hole 26h of the second plate 26. In this embodiment, the thickness of the first plate 24 is greater than the thickness of the second plate 26. The thickness of the bottom of the bezel cup 50 is less than the thickness of the first plate 24.

Referring to FIGS. 10-11, a wire 30 having an end 30e is inserted through the holes 20h, 24h, 26h to form a workpiece W' comprising the first component 20, the first plate 24, and the second plate 26. The workpiece W' is then placed on a hard surface S so that the second plate 26 and the end 30e of the wire 30 are in contact with the surface S. As discussed previously, flush cutters are then used to cut the wire 30 flush with the first plate 24.

Figure 12:
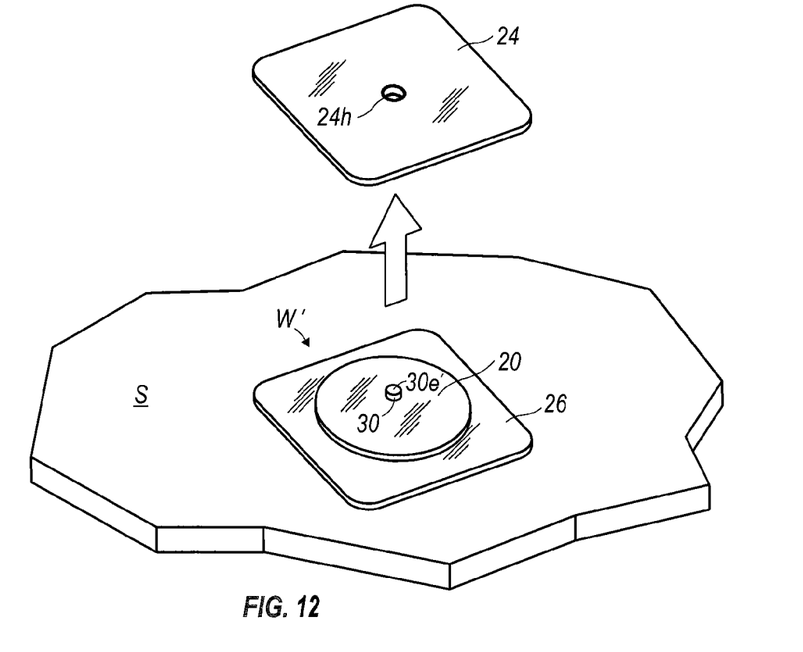

Referring to FIG. 12, the first plate 24 is removed from the workpiece W', leaving a length of the wire 30 equal to the thickness of the first plate 24 and terminating in a wire end 30e'.

Figure 13:
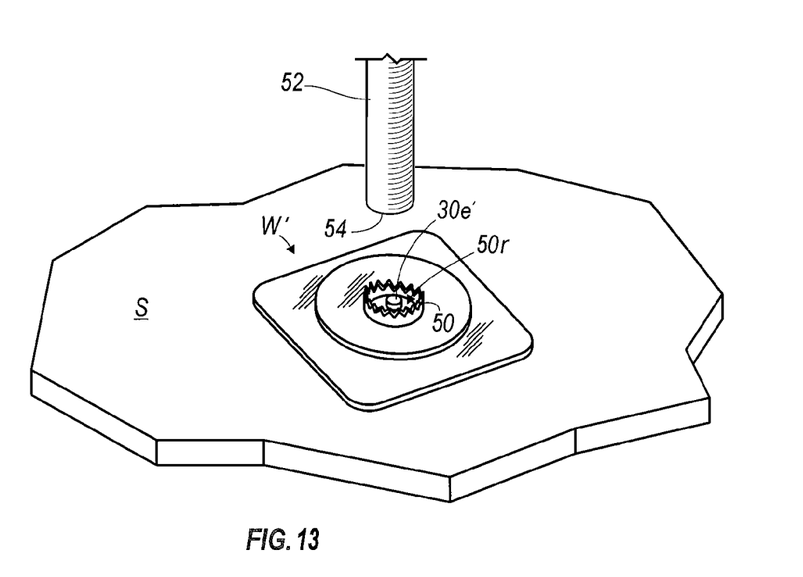

Referring to FIG. 13, the bezel cup 50 is then added to the workpiece W' by threading the wire end 30e through the cup hole 50h. Because the thickness of the first plate 24 is greater than the thickness of the bottom of the bezel cup 50, a portion of the wire 30 extends past the bottom and occupies the cup recess 50r. A rivet setter 52 having a working end 54 is positioned in the bezel cup 50 so it contacts the wire end 30e'. The rivet setter 52 is struck with hammer—typically several times—which flares the wire end 30e' inside the recessed area and flattens the wire end 30' into a rivet head occupying the recess 50r.

Figure 14:
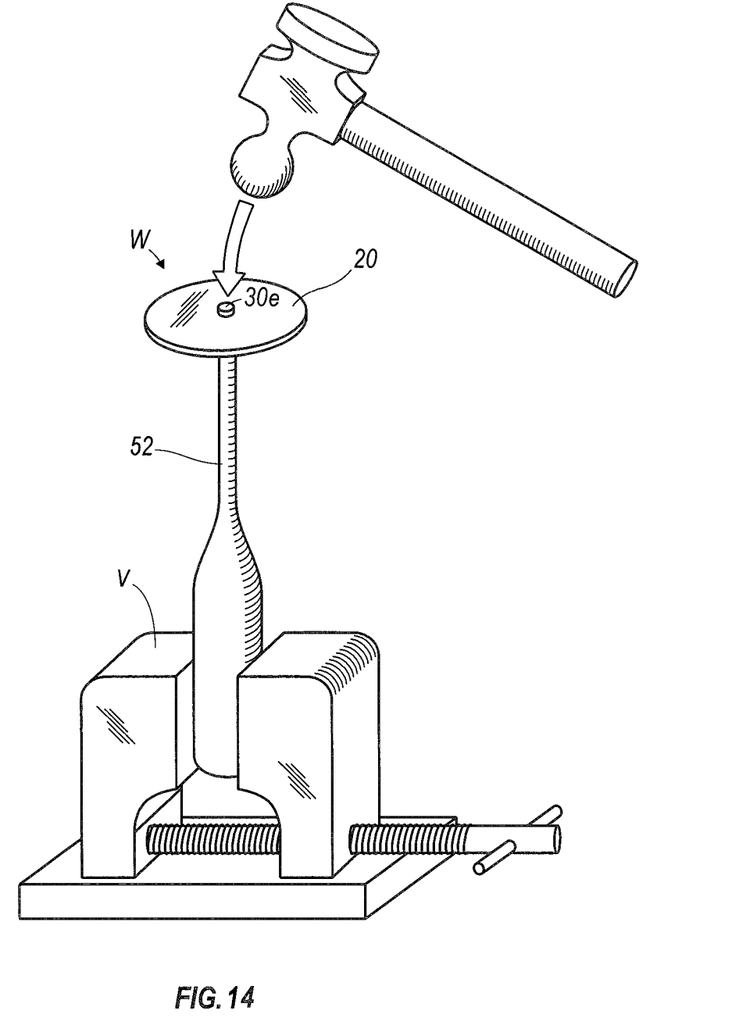

Referring to FIG. 14, to flatten the other end 30e of the wire 30, the rivet setter 52 is placed in a vise V with the working end pointed up. The workpiece W' is now inverted so that the recessed area of the bezel cup 50 is sitting on the rivet setter. At this point, the wire end 30e is flattened with a hammer, with the rivet setter 52 acting as a surface supporting the previously-flattened end of the wire 30. Alternatively, if a hammer cannot access the wire, a second rivet setter could be used.

The present disclosure discloses illustrative embodiments in which a specific embodiment of the method is described. Alternative embodiments of such a method may be used in carrying out the invention as claimed and such alternative embodiments are intended to be limited only by the claims themselves.

The invention claimed is:

1. A method of connecting a first jewelry component having a first hole of a first diameter with a second jewelry component having a second hole of a second diameter, the method comprising:
   aligning the first hole and the second hole with a third hole defined by a first plate having a first thickness and a fourth hole defined by a second plate having a second thickness, wherein the third hole has a third diameter and the fourth hole has a fourth diameter, and wherein the first hole and the second hole are linearly between the third hole and the fourth hole;
   inserting a length of material having an outer diameter and a first end into the first hole, the second hole, the third hole, and the fourth hole to form a workpiece comprising the first plate, the second plate, the length of material, the first jewelry component, and the second jewelry component, the workpiece having a first outer surface and second outer surface;
   placing the workpiece on a first surface so the first end of the length of material contacts the first surface, the first plate is in contact with the first surface, the first jewelry component is in contact with the first plate, the second jewelry component is in contact with the first jewelry component, and the second plate is in contact with the second jewelry component;
   cutting the length of material flush with the second plate to form a second end, wherein the length of material between the first end and the second end is equal to the distance between the first outer surface and the second outer surface;
   removing the second plate from the workpiece;
   flattening the second end of the length of material;
   placing the second end of the length of material on a second surface;
   removing the first plate from the workpiece; and
   flattening the first end of the length of material.

2. The method of claim 1 wherein the step of flattening the second end of the length of material forms a first rivet head and the step of flattening the first end of the length of material forms a second rivet head.

3. The method of claim 1 wherein the first surface and the second surface are the same.

4. The method of claim 1 wherein the first thickness is equal to the second thickness.

5. The method of claim 1 wherein the length of material is a wire.

6. The method of claim 1 wherein the length of material is tubing.

7. The method of claim 1 wherein the outer diameter is twice the first thickness.

8. A method of forming a decorative rivet connected to a jewelry component having a component hole of a first diameter, the method comprising:
   aligning the component hole with a first hole defined by a first plate having a first thickness and a second hole defined by a second plate having a second thickness, wherein the first hole has a first diameter and the second hole has a second diameter;
   inserting a length of material having an outer diameter and a first end into the first hole, the second hole, and the component hole to form a workpiece comprising the first plate, the second plate, the length of material, and the jewelry component, the workpiece having a first outer surface and second outer surface;
   placing the workpiece on a first surface so the first end of the length of material contacts the first surface, the first plate is in contact with the first surface, the jewelry component is in contact with the first plate, and the second plate is in contact with the jewelry component;
   cutting the length of material flush with the second plate to form a second end, wherein the length of material between the first end and the second end is equal to the distance between the first outer surface and the second outer surface;
   removing the second plate from the workpiece;
   flattening the second end of the length of material;
   placing the second end of the length of material on a second surface;
   removing the first plate from the workpiece; and
   flattening the first end of the length of material.

9. The method of claim 8 wherein the step of flattening the second end of the length of material forms a first rivet head and the step of flattening the first end of the length of material forms a second rivet head.

\* \* \* \* \*